United States Patent [19]

Paton et al.

[11] Patent Number: 4,999,479
[45] Date of Patent: Mar. 12, 1991

[54] ELECTRODE WIRE

[76] Inventors: Boris E. Paton, ulitsa Kotsjubinskogo, 9, kv. 21; Nikolai M. Voropai, ulitsa Saljutnaya, 29a, kv. 25, both of Kiev; Boris A. Nikiforov, ulitsa Kuibysheva, 25, kv. 10, Magnitogorsk; Georgy A. Schegolev, ulitsa Oktyabrskaya, 11, kv. 20, Magnitogorsk; Gennady P. Logiiko, ulitsa Zhdanova, 22, kv. 15, Magnitogorsk; Vasily G. Mischanin, ulitsa Lermontova, 18, kv. 15, Zaporozhie, all of U.S.S.R.

[21] Appl. No.: 490,604

[22] PCT Filed: Jul. 26, 1988

[86] PCT No.: PCT/SU88/00148
§ 371 Date: Mar. 23, 1990
§ 102(e) Date: Mar. 23, 1990

[87] PCT Pub. No.: WO90/00953
PCT Pub. Date: Feb. 8, 1990

[51] Int. Cl.$^5$ .............................. B23K 35/10
[52] U.S. Cl. .................... 219/145.22; 219/146.24; 219/146.41
[58] Field of Search ............ 219/145.22, 146, 24, 219/146.41

[56] References Cited

U.S. PATENT DOCUMENTS 3,555,240  1/1971  Gloor .
4,137,446  1/1979  Blanpain .

FOREIGN PATENT DOCUMENTS 0097306  1/1984  European Pat. Off. .
2445751  8/1980  France .
505543   3/1976  U.S.S.R. .
1385121  2/1975  United Kingdom .
1481140  7/1977  United Kingdom .
1485571  9/1977  United Kingdom .

Primary Examiner—Clifford C. Shaw
Attorney, Agent, or Firm—Ladas & Parry

[57] ABSTRACT

The invention relates to the field of welding. Disclosure is made of a wire comprising a metal body (1) having a longitudinal cavity (3) filled with a charge (2) comprising at least one constituent from the group consisting of alloying and slag-forming constituents.

On the surface of the cavity (3) and the wire there is disposed a coat (4, 7) made up of at least two layers (5, 6 and 8, 9). Each of said layers (5, 6 and 8, 9) incorporates one constituent selected from the group consisting of alloying and slag-forming constituents. From 10 to 99 percent of the mass of the constituents in the layers (5, 6) of the coat (4) and in the layers (8, 9) of the coat (7) is disposed on the surface of the cavity (3), and the total area of the layers (5, 6) of the coat (4) and the layers (8, 9) of the coat (7) in cross section of the wire, incorporating the identical constituents, amounts to from 0.001 to 0.1 part of the area of the metal body (1).

9 Claims, 2 Drawing Sheets

ELECTRODE WIRE

TECHNICAL FIELD

The present invention relates to the field of welding, and in particular to an electrode wire comprising a metal body and a charge.

BACKGROUND OF THE INVENTION

Nowadays the consumable-electrode arc welding in shielding (oxidizing and inert) gases is the most widely used method of welding in the industry. In construction and on erection sites there is used unshielded consumable-electrode arc welding. Used as consumable electrodes are electrode wires of solid section and electrode wires having inner cavities filled with a powdered charge. A solid-section wire is essentially a homogeneous monolithic long metal rod. The electrode wire having inner cavities is a composite material comprising a thin-walled metal sheath of tubular or more complex section, and a charge. The charge enclosed in the inner cavity defined by the electrode wire sheath is a mechanical mixture of metal powders (iron powder, ferroalloys, alloying powders), slag-forming and stabilizing constituents. The ratio of cross-section area of the charge-filled cavity in the electrode wire having inner cavities to cross-section area of the whole wire usually equals from 0.5 to 0.8.

In welding with the use of solid-section wires both in shielding gases, especially oxidizing ones, and without additional shielding there occurs an increased spattering of electrode metal, as well as an unsatisfactory weld formation. To prevent formation of pores in the process of welding low-carbon and low-alloy steels, the electrode wires of solid section obligatorily comprise deoxidizers such as silicon, manganese, titanium, aluminium, having a closer affinity for oxygen than iron, as well as in some cases alloying constituents such as chromium, vanadium, molybdenum. The deoxidizers and alaloying elements present in the electrode wire worsen its ductility, make the process of manufacturing a small (0.6 to 1.6 mm) diameter wire needed for welding more complicated and expensive. It should be noted that the better quality of weld metal is required, the greater amount of alloying and deoxidizing elements will be contained in the wire and the lower will become its ductility (deformability). However, the presence of any of presently known combinations of alloying and deoxidizing elements in the composition of the solid-section wire fails to prevent spattering of electrode metal, as well as to substantially improve formation of a weld surface when welding in the shielding gases and to provide the required performance of the weld metal when using unshielded arc welding.

The electrode wires having inner cavities filled with the charge make it possible to obtain quality welds featuring high performance both in gas-shielded and unshielded arc welding. Ability of the electrode wire having inner cavities to deform in the process of cold working changes but slightly with a greater or smaller amount of alloying constituents present in the charge. However, in contrast to the solid-section wires the electrode wires having inner cavities are difficult-to-manufacture and need special feeding mechanisms having several pairs of feed rolls and applying inconsiderable unit pressure on the surface of wire made, as a rule, of cold-rolled low-carbon steel from 0.15 to 0.5 mm thick. Metal powder constituents in the composition of the charge of the electrode wire, mixed with slag-forming constituents are susceptible to corrosion, which limits the storage life of such wires; therefore the welding process with use of the electrode wire having inner cavities is insufficiently reliable for obtaining high-quality welds.

The charge of the electrode wire having inner cavities in spite of great amount of metal constituents (iron powder and ferroalloys) present therein does not conduct electric current and therefore, in the process of welding with use of such a wire, melting of its core considerably lags behind melting of its metal sheath. As a result of insufficient heating voluminous portions of the charge pass into a welding pool without melting-down, which decreases the effectiveness of a slag shield of droplets of molten metal in the process of their growth at the electrode end face and transfer into the welding pool, i.e. some part of the slag does not participate in protection of the molten metal from the atmospheric air. Thus the self-shielded electrode wires having inner cavities contain from 15 to 20 mass percent of shielding slag-forming materials in the charge which results in a lower welding efficiency thereof compared to solid-section wires.

Deformability in manufacture of the electrode wire having inner cavities is substantially lower than that of the solid-section wire as the thin-walled sheath whose strength is limited when being deformed should take a load produced by both the resistance to deformation of material of the sheath and resistance to deformation of the powdered change. Therefore, the process of manufacturing the electrode wires having inner cavities of small diameter is more complicated than the process of manufacturing the solid-section wires.

An increase in the melting efficiency of the electrode wire with maintaining good welding and fabrication characteristics of the electrode wire having inner cavities may be achieved in case of using a wire comprising a metal body incorporating alloying and deoxidizing constituents and a powdered charge located in longitudinal ducts of the metal body.

Most similar prior art disclosing a subject matter closely associated with the present invention is GB, A, No. 1,481,140 describing an electrode with comprising an alloyed metal body having at least one longitudinal cavity filled with a charge comprising at least one constituent selected from the group consisting of slag-forming and alloying constituents.

As distinct from the solid-section wire such a wire features a minimum spatter and quality weld formation. Moreover, this wire has a sufficient stiffness since it is manufactured not from a strip but from a shaped blank and does not require the use of special multiple-roll feed mechanisms. However, it is impossible to manufacture said wire with a diameter less than 1.6 mm because of a low ductility of the metal body. But is known that to obtain welds ensuring serviceability of structures made of steels comprising alloying constituents is possible only with use of the wire with a diameter of 1.6 mm and less for welding. The low ductility of the metal body depends on alloying constituents present therein. The greater the mass of the alloying constituents, the lower is ductility of the metal body. The requirements for a constant chemical composition throughout the metal body volume do not allow hot working and heat treatment to be performed after cold working of the metal body. The high temperature causes the chemical composition of near-the surface layers of the metal body to change due to interaction with the ambient atmosphere. In such a case the 1.6-mm diameter wire will have a metal body with chemical composition thereof upset in more than half of its volume, which will adversely affect the quality of the weld. Thus, the wire should be manufactured by cold working. However, it is impossible to obtain the wire of so intricate configuration of cross section without additional heat treatment due to the low ductility of the metal body. Moreover, even if the main part of the alloying constituents necessary for welding is introduced in the charge of the electrode wire their losses amount to from 20 to 90 percent depending on the welding conditions and affinity of the alloying constituent for oxygen. Therefore, introduction of alloying constituents in the composition of the wire metal body impairs its deformability, and the presence thereof in the charge composition brings about considerable burn-out losses during welding.

SUMMARY OF THE INVENTION

The principle object of the invention is to provide such an electrode wire featuring such a structure, chemical and quantitative composition that would ensure high ductility of the metal body when subjected to cold working thus making it possible to manufacture a wire having good welding and fabrication characteristics, that is, minimum losses of alloying elements in the process of melting thereof, a high efficiency of the welding process and a highly effective utilization of heat of melting thereof.

The problem stated above is solved by that in an electrode wire comprising an alloyed metal body having at least one longitudinal cavity filled with a charge incorporating at least one constituent from the group consisting of slag-forming and alloying constituents, according to the invention, disposed on surfaces of the cavities and the wire is a coat made up of at least two layers each comprising a constituent selected from the group consisting of alloying and slag-forming constituents, from 10 to 99 percent of the constituents of the coat layers being disposed on the surfaces of the cavities and the total area of the coat layers in the wire cross section, comprising the identical constituents, amounts to from 0.001 to 0.1 part of the metal body area.

The main advantage of the wire of such a design is that disposition of alloying and slag-forming constituents on the surface of the cavities and the wire imparts new properties to the material of the metal body during cold working thereof, namely a high ductility of the metal body material, which manifests itself in an increased ability of the metal body to deform without breaking.

The advantages of such a wire over the prior art wires of similar type reside in a reduced consumption of alloying and slag-forming constituents for welding. Concentration of the major part of the alloying constituents not within the volume of the metal body but on the surfaces of the wire and cavities improves deformability of the wire. A decrease in quantity of the alloying and slag-forming constituents in the slag and application thereof to the surfaces of the cavities and the wire minimizes losses of the alloying elements in the process of wire melting as in this case the surface of their contact with the slag and gases in the process of wire heating prior to melting is less by one or two orders of magnitude. The quantity of constituents located in the cavities of the wire of such a design is brought to a minimum, which provides for a more effective utilization of heat for heating and melting the wire. Moreover, the slag-forming constituents not conducting current under usual conditions become conductors, if applied to the surface in the form of a thin film, i.e. with a slag-forming constituent layer on the surfaces of the wire and cavity thinner than a preset value (individual for each constituent) it is melted like the metal body with the aid of heat released within the volume of the metal body due to electrical resistance and not due to heat transfer from the metal body, which increases the welding process efficiency as well.

Disposition of less than 10 percent of the mass of constituents of the coat on the surface of the cavities substantially affects the weld chemical composition since in the process of welding the coat constituents are sublimated and oxidized to a considerable extent due to the interaction with the ambient air. Application of more than 99 percent of the mass of constituents of the coat to the surface of the cavities is associated with considerable difficulties in preventing the interaction between the wire surface and a coat application source.

With the total area of one constituent being less than 0.001 part of the area of the metal body its effect is inefficient as the expenditures for application of the coat become higher than the effect obtained from the improved properties of the weld and increased productivity. With the total area of one and the same constituent exceeding 0.1 part of the area of the metal body the efficiency of effect of the constituent also decreases as in this case the favourable effect of the coat on the efficiency of wire melting and productivity of melting is almost inappreciable but the expenditures for application of the coat drastically rise.

Preferably the alloying constituents are selected from the group consisting of Mg, Al, Si, Ca, Ti, V, Cr, Mn, Co, Ni, Cu, Y, Zr, Nb, Mo, Cd, Ba, La, Ta, W, Ce.

Presence of these constituents on the surfaces of the cavities and the wire is stipulated by their ability to improve ductility of the metal body and their alloying effect on the composition of the weld metal.

It is also preferable to select the slag-forming constituents from the group consisting of carbides, fluorides, chlorides and oxides of Mg, Al, Si, Ca, Ti, V, Cr, Mn, Co, Ni, Cu, Y, Zr, Nb, Mo, Cd, Ba, La, Ta, W, Ce.

The advantages of such a wire compared with the prior art wires consist in an increased ultimate deformability thereof due to the improved ductility of the metal body. The improved ductility with high welding and fabrication properties of the wire maintained is achieved due to location of the slag-forming constituents directly on the surfaces of the wire and cavities. It makes possible to obtain the wire having the diameter smaller than the diameter of the prior art wire. Besides, location of the slag-forming constituents on the surfaces of the wire and cavities makes it possible to reduce dimensions of the cavities and, hence, to increase the relative volume of the metal body in the wire and to carry out the welding process very efficiently. Moreover, a reliable protection of molten metal with a slag envelope (formed during melting of the slag) in the process of welding and an adequate detachability of the slag envelope from the surface of the weld are provided. The effective protection of the molten metal depends on the proposed location of the slag-forming constituents on the surfaces of the cavities and the wire.

It is preferable that the ductility of the constituent of the layer adjacent to the metal body and of the layer most distant therefrom is higher than the ductility of the metal body.

Higher ductility of these layers compared with the ductility of the metal body makes it possible to improve still more the deformability of the material of the metal body. An increase in the ductility of the metal body is caused by the action produced thereon by the coat. The necessity of applying more ductile layers compared to the ductility of the metal body directly on the metal body depends on the mechanism of plastic deformation which causes an increase in the ductility of the metal body. Higher ductility of the metal body in turn makes it possible to obtain a small-diameter (less than 1.6 mm) wire and to increase the capacity of the equipment.

The coat layers formed of constituents whose ductility is lower than the ductility of the metal body may be arranged between the layers having the ductility higher than the ductility of the metal body.

In such a case in the process of drawing the wire its ultimate deformability is increased as less ductile constituents are enclosed in ductile covers and therefore can deform without affecting the general ability of the metal body to deform. An increase in the ultimate deformability of the wire results in a higher efficiency of the manufacturing process and makes it possible to obtain a small diameter wire without additional heat treatment, which favourably affects the quality of the weld.

A coat whose layers comprise alloying and slag-forming constituents conducting electrical current may be applied to the wire surface.

This improves supply of current to the metal body and increases the efficiency of wire melting in the process of welding.

Disposed on the wire surface may be a coat comprising at least three layers of which the layer most distant from the metal body and the layer adjacent to it are made from alloying and slag-forming constituents conducting electrical current, whereas the layer positioned therebetween is made up of sections comprising alloying and slag-forming constituents conducting electrical current and sections alternated therewith along the wire and comprising alloying and slag-forming constituents featuring a current-insulating property.

In this case it becomes possible to apply to the wire surface the constituents having insulating properties but producing a favourable effect on the welding process. The current-conducting sections make it possible not to reduce the efficiency of welding and to provide uniform supply of current to the metal body.

It is preferable to dispose on the wire surface a coat comprising at least three layers of which the layer most distant from the metal body and the layer adjacent to it are made from alloying constituents, whereas the layer positioned therebetween is made from slag-forming constituents.

This makes it possible to increase the ultimate deformability of the wire, to obtain small diameters of the wire and to ensure high quality of the weld.

A coat may be disposed on the surfaces of the wire and cavities, in which the hardness of constituents of the layer adjacent to the metal body and constituents of the layer most distant therefrom is lower than the hardness of the metal body.

This also makes it possible to increase the ultimate deformability of the wire as well as the efficiency of process of manufacturing thereof, and to obtain the wire of smaller diameters and the welds of better quality.

Preferably, coat layers comprising constituents whose hardness is higher than the hardness of the metal body to interpose between the layers incorporating constituents whose hardness is lower than the hardness of the metal body.

In this case in the process of plastic working of the wire it becomes easier to deform the layers comprising constituents which are harder than the metal body due to additional stresses arising in these layers. This in turn makes it possible to increase the ultimate deformability of the wire, to increase the efficiency of the manufacturing process, to obtain the wire of small diameters and to improve its quality.

BRIEF DESCRIPTION OF THE DRAWINGS

The invention will be further described, by way of example, with reference to the accompanying drawings, in which.

BEST MODE OF CARRYING OUT THE INVENTION

An electrode wire of the invention shown in cross section in FIGS. 1 through 6, comprises an alloyed metal body provided with at least one longitudinal cavity filled with a charge comprising slag-forming and alloying constituents. According to the invention on surfaces of the cavities and of the wire there is disposed a coat made up of at least two layers each comprising a constituent selected from the group consisting of alloying and slag-forming constituents. From 10 to 99 percent of the mass of the layers of the coat is disposed on the surfaces of the cavities, and the total area of the coat layers in cross section of the wire incorporating the identical constituents equals from 0.001 to 0.1 part of the area of the metal body. The alloying constituents are selected from the group consisting of Mg, Al, Si, Ca, Ti, V, Cr, Mn, Co, Ni, Cu, Y, Zr, Nb, Mo, Cd, Ba, La, Ta, W, Ce, and the slag-forming constituents are selected from the group consisting of carbides, oxides, chlorides and fluorides of Mg, Al, Si, Ca, Ti, V, Cr, Mn, Co, Ni, Cu, Y, Zr, Nb, Mo, Cd, Ba, La, Ta, W, Ce. The ductility of the constituents of the layer adjacent to the metal body and the ductility of the constituents of the layer most distant therefrom are higher than the ductility of the metal body. The coat layers incorporating the constituents the ductility of which is lower than the ductility of the metal body are interposed between the layers incorporating the constituents the ductility of which is higher than the ductility of the metal body. Disposed on the surface of the wire is a coat whose layers comprise alloying and slag-forming constituents conducting electrical current. Disposed on the surface of the wire is a coat comprising at least three layers of which the layer most distant from the metal body and the layer adjacent thereto are made from alloying and slag-forming constituents conducting electrical current, and the layer interposed between said layers is made up of sections comprising the alloying and slag-forming constituents conducting electrical current and of sections alternated therewith and comprising alloying and slag-forming constituents posessing a current-insulating property, i.e. not conducting electrical current. Disposed on the wire surface is a coat made up of at least three layers of which the layer most distant from the metal body and the layer adjacent thereto are made of alloying constituents, whereas the layer interposed therebetween is made of slag-forming constituents.

The hardness of the constituents of the layer adjacent to the metal body and of the layer most distant therefrom is lower than the hardness of the metal body. The coat layers comprising the constituents whose hardness is higher than the hardness of the metal body are disposed between the layers comprising the constituents whose hardness is lower than the hardness of the metal body.

Figure 1:
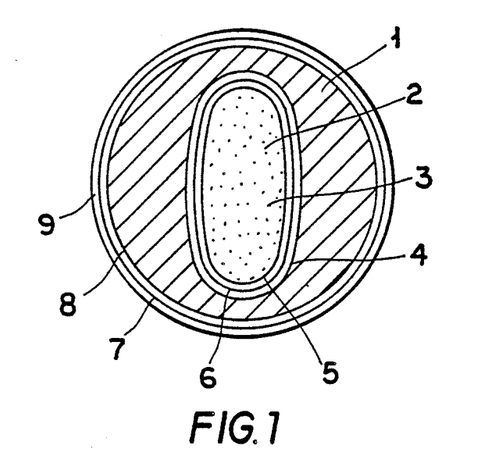
FIG. 1 is a general view in cross section of an embodiment of the invention representing an electrode wire having an oval cavity and a two-layer coat on the surfaces of the wire and the cavity.

An electrode wire shown in FIG. 1 incorporates an alloyed metal body 1 and a charge 2 comprising at least one constituent from the group consisting of alloying and slag-forming constituents and disposed in an oval cavity 3. In accordance with the invention on the surface of the cavity 3 there is disposed a coat 4 made up of two layers 5 and 6. Each of the layers 5 and 6 comprises one constituent selected from the group consisting of alloying and slag-forming constituents, whereas on the surface of the wire there is disposed a coat 7 made up of two layers 8 and 9. Each of the layers 8 and 9 comprises one constituent selected from the group consisting of alloying and slag-forming constituents. From 10 to 99 percent of the mass of the constituents in the layers 5 and 6 of the coat 4 and in the layers 8 and 9 of the coat 7 is disposed on the surface of the cavity 3, and the total area of the layers 5 and 6 of the coat 4 and the layers 8 and 9 of the coat 7 in cross section of the wire, incorporating the identical constituents equals from 0.001 to 0.1 part of the area of the metal body 1.

Figure 2:
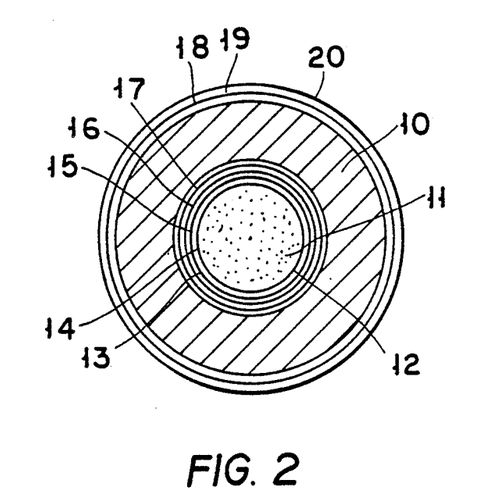
FIG. 2 is a general view in cross section of another embodiment of the invention representing an electrode wire having a cylindrical cavity with a four-layer coat applied to its surface and a two-layer coat applied to the surface of the wire.

An electrode wire shown in FIG. 2 comprises a metal body 10 and a charge 11 comprising at least one constituent from the group consisting of alloying and slag-forming constituents and disposed in one longitudinal cylindrical cavity 12. According to the invention disposed on the surface of the cavity 12 is a coat 13 made up of four layers 14, 15, 16 and 17 each of which comprises one constituent selected from the group consisting of alloying and slag-forming constituents. Provided on the surface of the wire is a coat 18 made up of two layers 19 and 20 each of which comprises one constituent selected from the group consisting of alloying and slag-forming constituents. The alloying constituents are also selected from the group consisting of Mg, Al, Si, Ca, Ti, V, Cr, Mn, Co, Ni, Cu, Y, Zr, Nb, Mo, Cd, Ba, La, Ta, W, Ce, and the slag-forming constituents are also selected from the group consisting of oxides, carbides, chlorides and fluorides of Mg, Al, Si, Ca, Ti, V, Cr, Mn, Co, Ni, Cu, Y, Zr, Nb, Mo, Cd, Ba, La, Ta, W, Ce. From 10 to 99 percent of the mass of the constituents in the layers 14, 15, 16 and 17 of the coat 13 and in the layers 19 and 20 of the coat 18 is disposed on the surface of the cavity 12, and the total area of the layers 14, 15, 16 and 17 of the coat 13 and the layers 19 and 20 of the coat 18 in cross section of the wire, incorporating the identical constituents, equals from 0.001 to 0.1 part of the area of the metal body 10.

Figure 3:
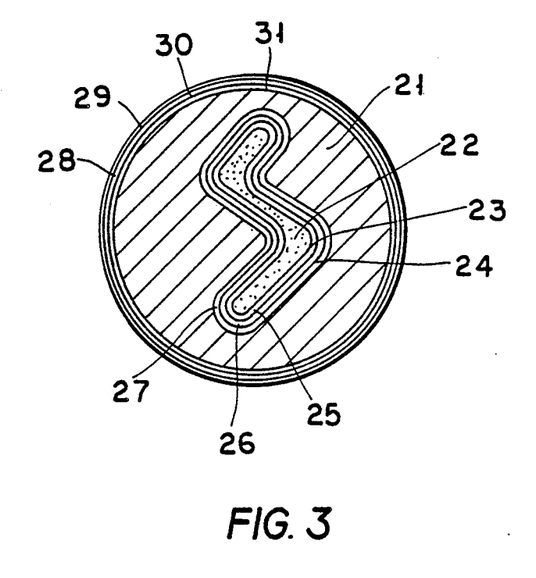
FIG. 3 is a cross section view of still another embodiment of the invention representing an electrode wire having a complex-shaped cavity and a three-layer coat on the surfaces of the wire and the cavity.

An electrode wire illustrated in FIG. 3 comprises an alloyed metal body 21 and a charge 22 comprising at least one constituent from the group consisting of alloying and slag-forming constituents and disposed in a complex-shaped cavity 23. According to the invention the surface of the cavity 23 has a coat 24 made up of three layers 25, 26 and 27 each of which comprises one constituent selected from the group consisting of alloying and slag-forming constituents. On the surface of the wire there is disposed a coat 28 made up of three layers 29, 30 and 31 each of which comprises one constituent selected from the group consisting of alloying and slag-forming constituents. From 10 to 99 percent of the mass of the constituents in the layers 25, 26 and 27 of the coat 24 and in the layers 29, 30 and 31 of the coat 28 is disposed on the surface of the cavity 23, whereas the total area of the layers 25, 26 and 27 of the coat 24 and the layers 29, 30 and 31 of the coat 28 in cross section of the wire incorporating the identical constituents, equals from 0.001 to 0.1 part of the area of the metal body 21. The ductility of the constituent of the layer 27 adjacent to the metal body 21 and the constituent of the layer 25 most distant therefrom is higher than the ductility of the metal body 21. The ductility of the constituents of the layer 31 adjacent to the metal body 21 and of the layer 29 most distant therefrom, is higher than the ductility of the metal body 21.

Figure 4:
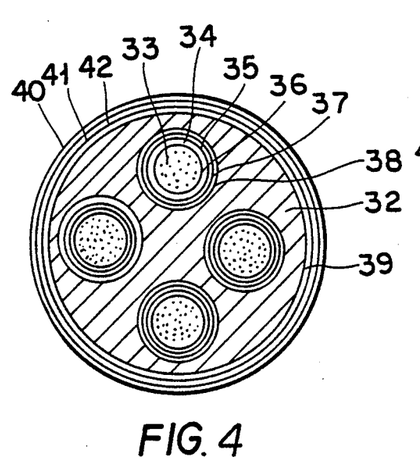
FIG. 4 is a cross section view of an embodiment of the invention representing an electrode wire having four cylindrical cavities and a three-layer coat on the surfaces of the wire and the cavities.

An electrode wire shown in FIG. 4 comprises an alloyed metal body 32 and a charge 33 comprising at least one constituent from the group consisting of alloying and slag-forming constituents, and disposed in four cylindrical cavities 34. According to the invention disposed on the surface of the cavities 34 is a coat 35 made up of three layers 36, 37 and 38 each of which comprises one constituent selected from the group consisting of alloying and slag-forming constituents. On the surface of the wire there is disposed a coat 39 made up of three layers 40, 41 and 42 each of which comprises one constituent selected from the group consisting of alloying and slag-forming constituents. From 10 to 99 percent of the mass of the constituents in the layers 36, 37 and 38 of the coat 35 and in the layers 40, 41 and 42 of the coat 39 is disposed on the surface of the cavities 34, whereas the total area of the layers 36, 37 and 38 of the coat 35 and the layers 40, 41 and 42 of the coat 39 in cross section of the wire, incorporating the identical constituents, equals from 0.001 to 0.1 part of the area of the metal body 32.

The layers 40, 41 and 42 of the coat 39 comprise the alloying and slag-forming constituents conducting electrical current.

Figure 5:
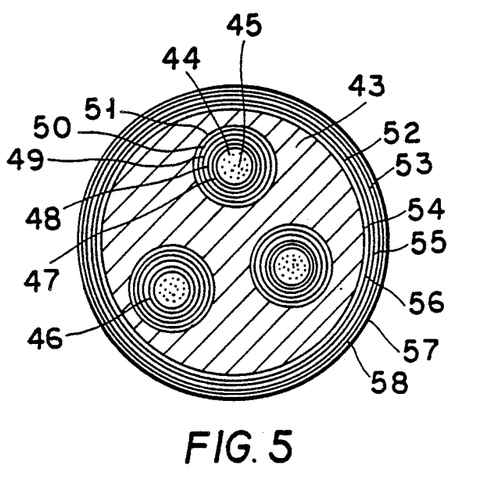
FIG. 5 is a cross section view of an embodiment of the invention representing an electrode wire having three cylindrical cavities and a five-layer coat on the surfaces of the wire and the cavities.

An electrode wire shown in FIG. 5 comprises an alloyed metal body 43 and a charge 44 comprising at least one constituent from the group consisting of alloying and slag-forming constituents and disposed in three cylindrical cavities 45. According to the invention disposed on the surfaces of the cavities 45 is a coat 46 made up of five layers 47, 48, 49, 50 and 51 each of which comprises one constituent selected from the group consisting of alloying and slag-forming constituents. Disposed on the surface of the wire is a coat 52 made up of six layers 53, 54, 55, 56, 57 and 53 each of which comprises one constituent selected from the group consisting of alloying and slag-forming constituents. From 10 to 99 percent of the mass of the constituents in the layers 47, 48, 49, 50 and 51 of the coat 46 and in the layers 53, 54, 55, 56, 57 and 58 of the coat 52 is disposed on the surfaces of the cavities 45, and the total area of the layers 47, 48, 49, 50 and 51 of the coat 46 and the layers 53, 54, 55, 56, 57 and 58 of the coat 52 in cross section of the wire, incorporating the identical constituents, equals from 0.001 to 0.1 part of the area of the metal body 43. The layers 47, 49 and 51 of the coat 46 are made of the alloying constituents and the layers 48 and 50 interposed therebetween are made of the slag-forming constituents.

Figure 6:
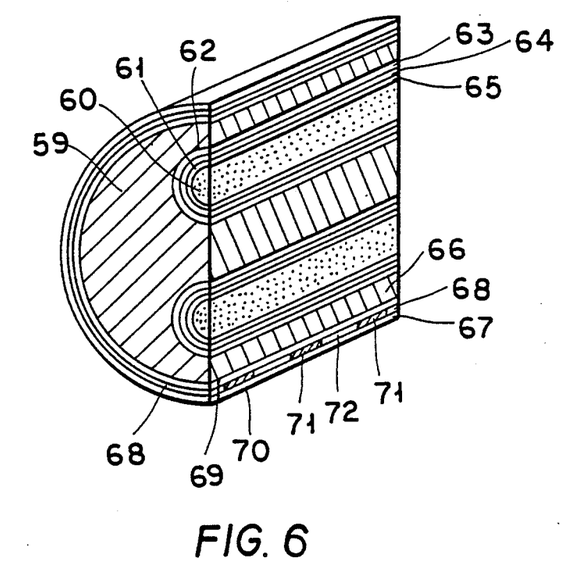
FIG. 6 is a partially perspective cut-away view of an embodiment of the invention representing an electrode wire having two cylindrical cavities and a three-layer coat on the surfaces of the wire and the cavities, the middle layer of the coat on the surface of the wire being made of alternate current-conducting and insulating sections.

An electrode wire illustrated in FIG. 6 comprises an alloyed metal body 59 and a charge 60 comprising at least one constituent from the group consisting of alloying and slag-forming constituents and disposed in two cylindrical cavities 61. In accordance with the invention on the surfaces of the cavities 61 there is disposed a coat 62 made up of three layers 63, 64 and 65 each of which comprises one constituent selected from the group consisting of alloying and slag-forming constituents. Disposed on the surface of the wire is a coat 66. A plane 67 is a plane of symmetry of the wire. The coat 66 has three layers 68, 69 and 70. Each of the layers 68 and 70 is made of one constituent selected from the group consisting of alloying and slag-forming constituents. The layer 69 includes sections 71 comprising alloying and slag-forming constituents conducting electrical current and sections 72 alternating with the sections 71 along the wire and comprising alloying and slag-forming constituents posessing a current-insulating property, i.e. not conducting electrical current. From 10 to 99 percent of the mass of the constituents in the layers 63, 64 and 65 of the coat 62 and in the layers 68, 69 and 70 of the coat 66 is disposed on the surfaces of the cavities 61, and the total area of the layers 63, 64 and 65 of the layer 62 and the layers 68, 69 and 70 of the coat 66 in cross-section of the wire, incorporating the identical constituents, equals from 0.001 to 0.1 part of the area of the metal body 59.

Further will be given specific examples of carrying out the invention.

EXAMPLE 1

An electrode wire of 1.2 mm diameter comprises a metal body comprising in mass percent: C—0.08; Mn—0.8; Si—0.2; Fe—the balance, a charge disposed in a cavity of the oval cross section and comprising powdered slag-forming constituents $TiO_2$, $CaF_2$, MgO and an alloying constituent Mn, and coats disposed on the surfaces of the wire and the cavity and made up each of two layers Cu and Ni which are alloying constituents. 90 percent of the mass of the constituents Cu and Ni of the coat is disposed on the surface of the wire, whereas 10 percent of their mass is disposed on the surface of the cavity. The area of the layers of the coats in cross section of the wire, incorporating the constituent Cu, amounts to 0.01 part of the area of the metal body and the area of the coat layers incorporating the constituent Ni amounts to 0.005 part of the area of the metal body. The layers incorporating Cu are disposed directly on the metal body. The thickness of the layers made of Cu equals $2.4 \cdot 10^{-3}$ mm and $4.5 \cdot 10^{-3}$ mm respectively on the surfaces of the wire and the cavity, and the thickness of the layers made of Ni respectively on the surfaces of the wire and the cavity equals $1.2 \cdot 10^{-3}$ mm and $2.25 \cdot 10^{-3}$ mm. The area of the cavity amounts to 10 percent of the area of the wire in cross section. The ductility of the constituent Cu in the layer adjacent to the metal body and the ductility of the constituent Ni in the layer most distant from the metal body are higher than the ductility of the metal body. The ductility of the constituents Cu, Ni and the metal body is characterized by a reduction of area at fracture and is equal to 80, 72 and 43 percent, respectively.

EXAMPLE 2

An electrode wire of 1.2 mm diameter comprises a metal body comprising in mass percent: C—0.08, Mn—0.9, Si—0.6, Fe—the balance, a charge disposed in an oval cross-section cavity and comprising powdered slag-forming constituents CaO, $BaF_2$, $MgF_2$ and an alloying constituent Ni, and coats disposed on the surfaces of the wire and the cavity and each made up of two layers Cu and Al which are alloying constituents. 90 percent of the mass of the constituents Cu and Al of the coat is disposed on the surface of the wire and 10 percent of their mass is disposed on the surface of the cavity. The total area of the layers of the coats in cross section of the wire comprising the constituent Cu amounts to 0.01 part of the area of the metal body, and comprising the constituent Al amounts to 0.02 part of the area of the metal body. The layers made of Cu are disposed directly on the metal body. The thickness of the layers made of Cu equal $2.4 \cdot 10^{-3}$ mm and $18.0 \cdot 10^{-3}$ mm on the surface of the wire and on the surface of the cavity, respectively. The thickness of the layers made of Al on the surface of the wire and on the surface of the cavity equals $1.2 \cdot 10^{-3}$ mm and $9.0 \cdot 10^{-3}$ mm, respectively.

The area of the cavity amounts to 10 percent of the the area of the wire in cross section. The reduction of area at fracture of Cu, Al and the metal body is equal to 80, 86 and 36 percent, respectively.

EXAMPLE 3

An electrode wire of 1.2 mm diameter has a metal body comprising in mass percent: C—0.1, Mn—0.6, Si—0.4, Fe—the balance, a charge disposed in a cavity of the oval cross section and comprising powdered slag-forming constituents $V_2O_5$, NaF, MgO and alloying constituents Ti and Al, and coats on the surfaces of the wire and the cavity, each made up of two layers Cd and Cu which are alloying constituents. 50 percent of the mass of the constituents of the coat is disposed on the wire surface and 50 percent of the mass thereof is disposed on the cavity surface. The total area of the coat layers in the wire cross section, comprising the constituent Cd amounts to 0.02 part of the area of the metal body and comprising the constituent Cu amounts to 0.01 part of the area of the metal body. The layers comprising Cd are disposed directly on the metal body. The thickness of the layers made of Cd equals $2.5 \cdot 10^{-3}$ mm and $45 \cdot 10^{-3}$ mm on the surface of the wire and the cavity, respectively. The thickness of the layers made of Cu on the surface of the wire and the cavity respectively euqals $1.25 \cdot 10^{-3}$ mm and $22.5 \cdot 10^{-3}$ mm. The cavity area amounts to 10 percent of the wire area in cross section. The ductility of the constituent Cd in the layer adjacent to the metal body and the constituent Cu in the layer most distant therefrom is higher than the ductility of the metal body. A reduction of area at fracture of Cd, Cu and the metal body is equal to 88, 80 and 49 percent, respectively.

EXAMPLE 4

An electrode wire of 1.2 mm diameter has a metal body comprising in mass percent: C—0.1, Mn—1.2, Ni—0.9, Mo—0.2, Si—0.15, Fe—the balance, a charge disposed in a cavity of the cylindrical shape and comprising powdered constituents $CaF_2$, $BaF_2$, $SiO_2$ and MnO and an alloying constituent Al, and a coat incorporating two layers of Ca and Zr on the surface of the wire and four layers of constituents Ca, Zr, $MgF_2$ and Ni on the surface of the cavity. 25 percent of the mass of the coat constituents is disposed on the wire surface and 75 percent of the mass thereof is disposed on the surface of the cavity. The total area of the coat layers in cross section of the wire, comprising the constituents Ca, Zr, $MgF_2$ and Ni, respectively, amounts to 0.001 part of the cross-section area of the metal body. The thickness of the layers made of Ca, Zr on the surface of the wire equals $0.13 \cdot 10^{-3}$ mm. The thickness of the layers consisting of Ca, Zr, $MgF_2$ and Ni on the surface of the cavity is equal to $2.25 \cdot 10^{-3}$ mm, $2.25 \cdot 10^{-3}$ mm, $4.5 \cdot 10^{-3}$ mm and $4.5 \cdot 10^{-3}$ mm, respectively. The area of the cavity amounts to 10 percent of the wire cross-section area. The layers of Ca are disposed directly on the metal body. The ductility of Ca in the layers adjacent to the metal body and the ductility of Ni in the layer most distant from the metal body are higher than the ductility of the metal body. A reduction of area at fracture of Ca, Ni and the metal body equals 89, 72 and 30 percent, respectively. The ductility of $MgF_2$ is lower than the ductility of the metal body and the layer made of this constituent is interposed between the layers made of Zr and Ni whose ductility is higher than the ductility of the metal body. A reduction of area at fracture of Zr is equal to 65 percent.

EXAMPLE 5

An electrode wire with a diameter of 1.2 mm has a metal body comprising in mass percent: C—0.1, Mn—0.9, Ni—0.4, M.—0.4, Si—0.3, Fe—the balance, a charge disposed in a cavity of cylindrical shape and comprising powdered constituents $BaF_2$, $V_2O_3$ and CaO and an alloying constituent Cr, and a coat having two layers from constituents Co and Cu on the surface of the wire and four layers from constituents Nb, Al, $BaCl_2$ and Ni on the surface of the cavity. The layer from the constituent Co and the layer from the constituent Nb are disposed directly on the metal body. 90 percent of the mass of the coat constituents is disposed on the surface of the cavity and 10 percent of the mass is disposed on the surface of the wire. The total area of the coat layers in the wire cross section, made of the constituents Co, Cu, Nb, Al, $BaCl_2$ and Ni respectively amounts to 0.0013, 0.0013, 0.002, 0.002, 0.004 and 0.004 part of the cross-section area of the metal body. The thickness of the layers consisting of Co and Cu on the wire surface equals $0.35 \cdot 10^{-3}$ mm and $0.35 \cdot 10^{-3}$ mm, respectively. The thickness of the layers consisting of Nb, Al, $BaCl_2$ and Ni equals $9.0 \cdot 10^{-3}$ mm, $9.0 \cdot 10^{-3}$ mm, $18.0 \cdot 10^{-3}$ mm, respectively. The area of the cavity amounts to 10 percent of the wire cross-section area. The ductility of Co in the layer adjacent to the metal body and the ductility of Ni in the layer most distant from the metal body are higher than the ductility of the metal body. A reduction of area at fracture of Co, Ni and the metal body equals 76, 72 and 36 percent, respectively. A percentage reduction of area of $BaCl_2$ amounts to 16 percent. The ductility of the slag-forming constituent $BaCl_2$ is lower than the ductility of the metal body, and the layer of $BaCl_2$ is interposed between the layers Al and Ni, the ductility of which is higher than the ductility of the metal body.

EXAMPLE 6

An electrode wire with a diameter of 1.2 mm has a metal body comprising in mass percent: C—0.1, Mn—0.9, Ni—0.2, Mo—0.2, Si—0.15, Fe—the balance, a charge disposed in a cavity of the cylindrical shape and comprising powdered constituents $TiO_2$, $V_2O_5$, and CaO, and alloying constituents Cr and Co, and a coat having two layers from constituents Cu and Ni on the surface of the wire and four layers from Cu, Al, $MgF_2$ and Ni on the surface of the cavity. The layers from the constituent Cu are disposed directly on the metal body. 99 percent of the mass of the constituents of the coat is disposed on the surface of the cavity and 1 percent of the mass of the coat is disposed on the surface of the wire.

The total area of the coat layers in the wire cross section, consisting of the constituents Cu, Al, $MgF_2$ and Ni, amounts to 0.002, 0.004, 0.004 and 0.002 part of the cross-section area of the metal body, respectively. The thickness of the layers consisting of Cu and Ni on the surface of the wire equals $0.15 \cdot 10^{-3}$ mm for each constituent. The thickness of the layers made of Cu, Al, $MgF_2$ and Ni is equal to $9.0 \cdot 10^{-3}$ mm, $18.0 \cdot 10^{-3}$ mm, $9.0 \cdot 10^{-3}$ mm, respectively. The area of the cavity amounts to 10 percent of the wire cross-section area.

EXAMPLE 7

An electrode wire of 1.4 mm diameter has a metal body comprising in mass percent: C—0.12, Mn—1.4, Si—0.4, Mo—0.2, Ti—0.2, Fe—the balance, a charge disposed in a longitudinal cavity and comprising a slag-forming constituent $TiO_2$, and a coat made up of three layers consisting of constituents Cd, W and Al. 90 percent of the mass of the coat is disposed on the surface of the wire and the remaining 10 percent, on the surface of the cavity. The total area of the coat layers in cross section of the wire, consisting of the constituents Cd, W and Al, equals 0.08, 0.01, 0.08 part of the metal body cross-section area, respectively. The thickness of the layers made of Cd, W and Al on the surface of the wire is equal to $20.5 \cdot 10^{-3}$ mm, $2.0 \cdot 10^{-3}$ mm, $20.5 \cdot 10^{-3}$ mm, respectively. The thickness of the layers from Cd, W and Al on the surface of the cavity equals $50.0 \cdot 10^{-3}$ mm, $6.2 \cdot 10^{-3}$ mm, $50.0 \cdot 10^{-3}$ mm, respectively. The area of the cavity amounts to 20 percent of the wire area in cross section. The coat layers from W whose ductility (percentage reduction of area is 8 percent) is lower than the ductility of the metal body (elongation is 40 percent) are interposed between the layers from Cd and Al whose ductility is higher than that of the metal body (percentage reduction of area of Cd and Al equals 88 and 86 percent, respectively). Instead of $TiO_2$ the charge may incorporate as slag-forming constituents the constituents selected from the group consisting of chlorides, fluorides, carbides and oxides of Mg, Al, Si, Ca, Ti, V, Cr, Mn, Co, Ni, Cu, Y, Zr, Nb, Mo, Cd, Ba, La, Ta, W, Ce.

EXAMPLE 8

An electrode wire of 1.4 mm diameter comprises a metal body comprising in mass percent: C—0.12, Mn—1.4, Si—0.4, Mo—0.2, Ti—0.2, Fe—the balance, a charge disposed in a longitudinal cavity and comprising slag-forming constituents $TiO_2$, NaCl and Cr, and a coat made up of three layers consisting of constituents Cd, W, Al. 90 percent of the mass of the coat is disposed on the surface of the wire and the remaining 10 percent, on the surface of the cavity. The total area of the coat layers in the wire cross section, consisting of Cd, W and Al, is equal to 0.08, 0.01, 0.08 part of the metal body cross-section area, respectively. The thickness of the layers from Cd, W and Al on the surface of the wire equals $20.5 \cdot 10^{-3}$ mm, $2.6 \cdot 10^{-3}$ mm, $20.5 \cdot 10^{-3}$ mm, respectively. The thickness of the layers from Cd, W and Al on the surface of the cavity equals $50 \cdot 10^{-3}$ mm, $6.2 \cdot 10^{-3}$ mm, $50 \cdot 10^{-3}$ mm, respectively. The area of the cavity amounts to 20 percent of the wire area in cross section. Used instead of the alloying constituent Cd, W, Al, Cr may be Mg, Si, Ca, Ti, V, Mn, Co, Ni, Cu, Y, Zr, Nb, Mo, Ba, La, Ta, Ce.

EXAMPLE 9

An electrode wire of 1.4 mm diameter comprises a metal body comprising in mass percent: C—0.07, Mn—1.4, Al—1.2, Fe—the balance, a charge disposed in four cylindrical cavities and comprising slag-forming constituents $CaF_2$, $V_2O_5$ and alloying constituents Cr and Nb, and a coat made up of three layers consisting of constituents Co, $BaF_2$ and Ta. 90 percent of the mass of the coat is disposed on the surface of the wire and the remaining 10 percent, on the surface of the cavities. The thickness of the layers from Co, $BaF_2$ and Ta on the surface of the wire equals $20.5 \cdot 10^{-3}$ mm, $2.6 \cdot 10^{-3}$ mm and $20.5 \cdot 10^{-3}$ mm, respectively, and on the surface of each cavity equals $12 \cdot 10^{-3}$ mm, $1.4 \cdot 10^{-3}$ mm, respectively. The area of each cavity amounts to 5 percent of the area of the wire in cross section. The layer most distant from the metal body is made from the alloying constituent Ta and the layer adjacent thereto is made from the alloying constituent Co. The layer interposed therebetween is made from the slag-forming constituent $BaF_2$.

EXAMPLE 10

An electrode wire is similar to the wire of Example 9, except for the slag-forming constituent $BaF_2$, instead of which a slag-forming constituent $CaF_2$ is used.

EXAMPLE 11

An electrode wire with a diameter of 1.0 mm comprises a metal body comprising in mass percent: C—0.12, Mn—0.7, Si—0.03, Fe—the balance, a charge disposed in three longitudinal cavities and comprising $CaF_2$, $BaCl_2$ and V, and a coat made up of five layers consisting of constituents Zr, MnC, Cd, WC, Al.

The thickness of the coat layers on the wire surface made of Zr, MnC, Cd, WC, Al is equal to $5.0 \cdot 10^{-3}$ mm, $2.0 \cdot 10^{-3}$ mm, $5.0 \cdot 10^{-3}$ mm, $2.0 \cdot 10^{-3}$ mm, $5.0 \cdot 10^{-3}$ mm, respectively. The thickness of the coat layers from Zr, MnC, Cd, WC, Al on the surface of each cavity equals $10.0 \cdot 10^{-3}$ mm, $6.0 \cdot 10^{-3}$ mm, $10.0 \cdot 10^{-3}$ mm, $6.0 \cdot 10^{-3}$ mm, $10.0 \cdot 10^{-3}$ mm, respectively. The coat layers from the constituents MnO and WC whose hardness is higher than the hardness of the metal body are interposed between the layers from the constituents Zr, Cd, Al whose hardness is lower than the hardness of the metal body. The hardness of Zr, MnO, Cd, WC, Al and of the metal body is equal to 3, 6, 2.2, 9.7, 2.8, 5, respectively.

EXAMPLE 12

An electrode wire similar to the wire of Example 8s is characterized in that the charge additionally comprises a slag-forming constituent $BaF_2$. The hardness of the constituents Cd in the layers adjacent to the metal body and Al in the layer most distant from the metal body is lower than the hardness of the metal body. The hardness of Cd, Al and the metal body is equal to 2.2, 2.8 and 6, respectively.

EXAMPLE 13

An electrode wire similar to the wire of Example 9 is characterized in that the charge additionally comprises a slag-forming constituent $Cr_2O_3$ and does not comprise the alloying constituent Cr. On the surface of the wire there is disposed a coat whose layers are made from alloying constituents Co and Ta, as well as from the slag-forming constituent $BaF_2$ conducting electrical current.

EXAMPLE 14

An electrode wire similar to the wire of Example 9 is characterized in that in the coat instead of the layer from the slag-forming constituent $BaF_2$ use is made of a layer consisting of alternate sections from constituents Cu and NaCl. The alloying constituent Cu conducts electrical current, whereas the slag-forming constituent NaCl does not conduct electrical current.

The electrode wire described in Examples 1 through 14 makes it possible to reduce losses of the alloying constituents in the process of melting the wire by from 4 to 10 times, to increase the efficiency of the welding process by from 3 to 7 times, to prevent metal spatter. The use of the foregoing coats increases the metal body ductility during cold working by from 2 to 3 times and provides for obtaining a wire with a diameter less than 1.6 mm. The use of the wire having a diameter less than 1.6 mm makes it possible to obtain welds featuring a higher impact strength and a lower porosity.

INDUSTRIAL APPLICABILITY

The invention may advantageously be used in consumable-electrode arc welding both in shielding gases and without additional shielding when manufacturing metallic structures from low-carbon and low-alloyed steels.

In addition, the electrode wire of the invention may be used in surfacing and also as a filler material in welding with a nonconsumable (tungsten) electrode or in brazing.

We claim:

1. An electrode wire comprising an alloyed metal body (1; 10; 21; 32; 43; 59) provided with at least one longitudinal cavity (3; 12; 23; 34; 45; 61) filled with a charge (2; 11; 22; 33; 44; 60) comprising at least one constituent selected from the group consisting of slag-forming and alloying constituents, characterized in that on the surface of the cavity (3; 12; 23; 34; 45; 61) and the wire there is disposed a coat (4 and 7; 13 and 18; 24 and 28; 35 and 39; 46 and 52; 62 and 66) made up of at least two layers (5, 6; 8, 9; 14, 15, 16, 17; 19, 20; 25, 26, 27; 29, 30, 31; 36, 37, 38; 40, 41, 42; 47, 48, 49, 50, 51; 53, 54, 55, 56, 57, 58; 63, 64, 65; 68, 69, 70) each of which consists on one constituent selected from the group consisting of alloying and slag-forming constituents, from 10 to 99 percent of the mass of the constituents in the layers (5, 6; 8, 9; 14, 15, 16, 17; 19, 20; 25, 26, 27; 29, 30, 31; 36, 37, 38; 40, 41, 42; 47, 48, 49, 50, 51; 53, 54, 55, 56, 57, 58; 63, 64, 65; 68, 69, 70) of the coat (4, 7; 13, 18; 24, 28; 35, 39; 46, 52; 62, 66) being disposed on the surface of the cavity (3; 12; 23; 34; 45; 61), and the total area of the layers (5, 6; 8, 9; 14, 15, 16, 17; 19, 20; 25, 26, 27; 29, 30, 31; 36, 37, 38; 40, 41, 42; 47, 48, 49, 50, 51; 53, 54, 55, 56, 57, 58; 63, 64, 65; 68, 69, 70) of the coat (4, 7; 13, 18; 24, 28; 35, 39; 46, 52; 62, 66) in cross section of the wire, consisting of the identical constituents, being equal to from 0.001 to 0.1 part of the area of the metal body (1; 10; 21; 32; 43; 59).

2. An electrode wire according to claim 1, characterized in that the alloying constituents are selected from the group consisting of Mg, Al, Si, Ca, Ti, V, Cr, Mn, Co, Ni, Cu, Y, Zr, Nb, Mo, Cd, Ba, La, Ta, W, Ce and the slag-forming constituents are selected from the group consisting of carbides oxides, chlorides and fluorides of Mg, Al, Si, Ca, Ti, V, Cr, Mn, Co, Ni, Cu, Y, Zr, Nb, Mo, Cd, Ba, La, Ta, W, Ce.

3. An electrode wire according to claim 1, characterized in that the ductility of the constituents of the layer (27, 31) adjacent to the metal body (21) and the ductility of the constituents of the layer (25, 29) most distant therefrom are higher than the ductility of the metal body (21).

4. An electrode wire according to claim 3, characterized in that the layers (26, 30) of the coat (24, 28) made from the constituents the ductility of which is lower than the ductility of the metal body (21) are interposed between the layers (25 and 27, 29 and 31) made from the constituents the ductility of which is higher than the ductility of the metal body (21).

5. An electrode wire according to claim 1, characterized in that on the surface of the wire there is disposed the coat (39) the layers (40, 41, 42) of which contain alloying and slag-forming constituents conducting electrical current.

6. An electrode wire according to claim 1, characterized in that on the surface of the wire there is disposed the coat (66) made up of at least three layers (68, 69, 70) in which the layer (70) most distant from the metal body (59) and the layer (68) adjacent thereto are made from alloying and slag-forming constituents conducting electrical current, and the layer (69) interposed between the layers (68, 70) is made up of sections (71) incorporating alloying and slag-forming constituents conducting electrical current and of sections (72) alternated with the sections (71) and incorporating alloying and slag-forming constituents posessing a current-insulating property.

7. An electrode wire according to claim 1 characterized in that on the surface of the wire there is disposed the coat (28) made up of at least three layers in which the layer (31) most distant from the metal body (21) and the layer (29) adjacent thereto incorporates alloying constituents, and the layer (30) interposed between the layers (29 and 31) incorporates slag-forming constituents.

8. An electrode wire according to claim 1 characterized in that the hardness of the constituents of the layer (29) adjacent to the metal body (21) and the layer (31) most distant therefrom is lower than the hardness of the metal body (21).

9. An electrode wire according to claim 1 characterized in that the layers (30) of the coat (28) made from the constituents the hardness of which is higher than the hardness of the metal body (21) are interposed between the layers 29 and 31) made from the constituents the hardness of which is lower than the hardness of the metal body (21).

* * * * *